(12) United States Patent
Wang (10) Patent No.: US 7,269,205 B2
(45) Date of Patent: Sep. 11, 2007

(54) METHOD AND APPARATUS FOR SIGNAL DEMODULATION

(75) Inventor: Yi-Pin Eric Wang, Cary, NC (US)

(73) Assignee: Telefonaktiebolaget LM Ericsson (publ) (SE)

( * ) Notice: Subject to any disclaimer, the term of this patent is extended or adjusted under 35 U.S.C. 154(b) by 767 days.

(21) Appl. No.: 10/672,492

(22) Filed: Sep. 26, 2003

(65) Prior Publication Data
US 2005/0163199 A1 Jul. 28, 2005

(51) Int. Cl.
*H04B 1/707* (2006.01)
*H04L 27/06* (2006.01)

(52) U.S. Cl. ........................... 375/148; 375/340
(58) Field of Classification Search ........ 375/147–149, 375/340, 346, 347; 455/63.1
See application file for complete search history.

(56) References Cited

U.S. PATENT DOCUMENTS

| | | | |
|---|---|---|---|
| 6,108,375 A | | 8/2000 | Farrokh et al. |
| 6,952,561 B1* | | 10/2005 | Kumar et al. ............. 455/63.1 |
| 2002/0141515 A1 | | 10/2002 | Lundby |
| 2004/0179583 A1* | | 9/2004 | Jeong ........................ 375/147 |
| 2005/0201484 A1* | | 9/2005 | Wilhelmsson et al. ...... 375/286 |
| 2006/0126761 A1* | | 6/2006 | Bernhardsson et al. ..... 375/340 |

FOREIGN PATENT DOCUMENTS

EP 0 639 915 8/1994
EP 1 191 713 3/2002

OTHER PUBLICATIONS

Signaling of CPICH and DSCH power ratio for M-ary demodulation, AH24: High Speed Downlink Packet Transmission; TSG-RAN Working Group Meeting #16; Pusan, Korea, Sep. 10-13, 2000, 2 pgs.
UE complexity for AMCS; AH24: High S peed Downlink Packet Transmission; TSG-RAN Working Group Meeting #18, Boston, MA; Jan. 15-18, 2001; 6 pgs.
Choi, BJ et al.; Rake Receiver Detection of Adaptive Modulation Aided CDMA over Frequency Selective Channels; In Proceedings of VTC 2001 (Fall), Atlantic City; 5 pgs.

(Continued)

*Primary Examiner*—Don N. Vo
(74) *Attorney, Agent, or Firm*—Coats & Bennett, P.L.L.C.

(57) ABSTRACT

An exemplary receiver demodulates an amplitude modulated data signal received in association with a reference signal, wherein a transmit power of the data signal is unknown to the receiver circuit, by determining a scaling factor based on the reference and data signals. Thus, an exemplary receiver estimates scaling factors indicative of the received amplitude of a data channel signal that is transmitted at a power different from that of the reference channel being used to estimate the radio channel properties. The scaling factor may be used to correct the amplitude of information symbols recovered from a received data signal such that they are moved closer in amplitude to intended points within an amplitude modulation constellation and/or to scale nominal points in a reference constellation used in demodulating the received symbols.

60 Claims, 8 Drawing Sheets

OTHER PUBLICATIONS

Parkvall, et al.; Evolving WCDMA for Improved High Speed Mobile Internet; Proc. Future Telecommunications Conference 2001, Beijing, China, Nov. 28-30, 2001; 5 pgs.

Wang and Bottomley; Generalized RAKE Reception for Cancelling Interference from Multiple Base Stations; Proc. IEEE Vehicular Technology Conference, Boston; Sep. 24-28, 2000, 7 pgs.

Bottomley, et al; A Generalized RAKE Receiver for Interference Suppression; IEEE Journal on Selected Areas in Communications, vol. 18, No. 8, Aug. 2000; 10 pgs.

"A Method for Blind Determination of Pilot to Data Power Ratio for QAM Signals" TSG-RAN Working Group 1 Meeting #21, XX, XX, Aug. 2001, pp. 1-2, XP002272534.

* cited by examiner

METHOD AND APPARATUS FOR SIGNAL DEMODULATION

BACKGROUND OF THE INVENTION

The present invention generally relates to demodulating received signals, and particularly relates to demodulating signals having potentially unknown nominal amplitudes, such as in 16-ary Quadrature Amplitude Modulation (16QAM).

Evolving wireless communication standards look to a range of techniques to increase communication data rates. Modulation format, modulation and coding rate adaptation, incremental redundancy, hybrid ARQ, and fast scheduling all are coming into increasing use in the effort to increase data rates while maintaining acceptable robustness.

In particular, the adoption of relatively complex amplitude modulation formats poses significant challenges with regard to reliable signal demodulation. For example, quadrature amplitude modulation (QAM) schemes define "constellations" of symbol points, with each point having a unique combination of phase and amplitude. Commonly, the constellation points are symmetrically arranged around a zero amplitude origin, such that each phase quadrant has a like number of similarly positioned constellation points. 16QAM defines sixteen constellation points, with four points in each phase quadrant. Notably, the relative positioning of points within the constellation is fixed, but the absolute amplitudes (i.e., the distance from the constellation's amplitude origin) of the constellation points vary as a function of received amplitude, for example.

Commonly, particularly in CDMA systems, the remote receiver receives a reference signal (or signals) in conjunction with one or more data signals, e.g., traffic and/or control channel signals. The reference signal may be, for example, a pilot channel signal, pilot symbols, etc. In any case, the receiver knows the nominal reference signal and thus it uses the actual reference signal as received to estimate radio channel properties for the associated received data signal(s). Thus, the receiver maintains "channel estimates" based on receiving the reference signal, wherein the channel estimates characterize the current phase and attenuation properties of the radio channel. Thus, the receiver compensates the received data signal for channel effects using these channel estimates to thereby improve its reception performance.

However, where the received amplitudes of the reference and data signals is different, such as commonly occurs where the signals are transmitted at different transmit powers, the reference signal does not directly indicate what the absolute amplitudes of the received data signal symbols (constellation points) should be. Thus, the receiver may encounter difficulty in deciding which constellation points have been received.

Therefore, it is known to transmit additional information, i.e., data signal amplitude information, to facilitate demodulation of the received data signal by the remote receiver. Alternatively, it is known to transmit the data signal(s) at fixed relative amplitudes such that the receiver knows a priori the amplitude offset between the reference and data signals.

SUMMARY OF THE INVENTION

The present invention comprises a method and apparatus to determine a scaling factor based on received reference and data signals for use in demodulating the data signal, and wherein a transmit power of the data signal is unknown to the receiver and the scaling factor relates received amplitudes of the data and reference signals. Thus, in one or more exemplary embodiments, the present invention provides a method and apparatus for estimating the received amplitude of a data channel signal that was transmitted at a power different from the transmit power of the reference channel being used to estimate the received data signal's radio channel. Thus, in an exemplary embodiment, the present invention enables reliably demodulating QAM data signals, for example, wherein the amplitude relationship between the data and reference signals is not known a prior to the receiver.

DETAILED DESCRIPTION OF THE INVENTION

Figure 1A:
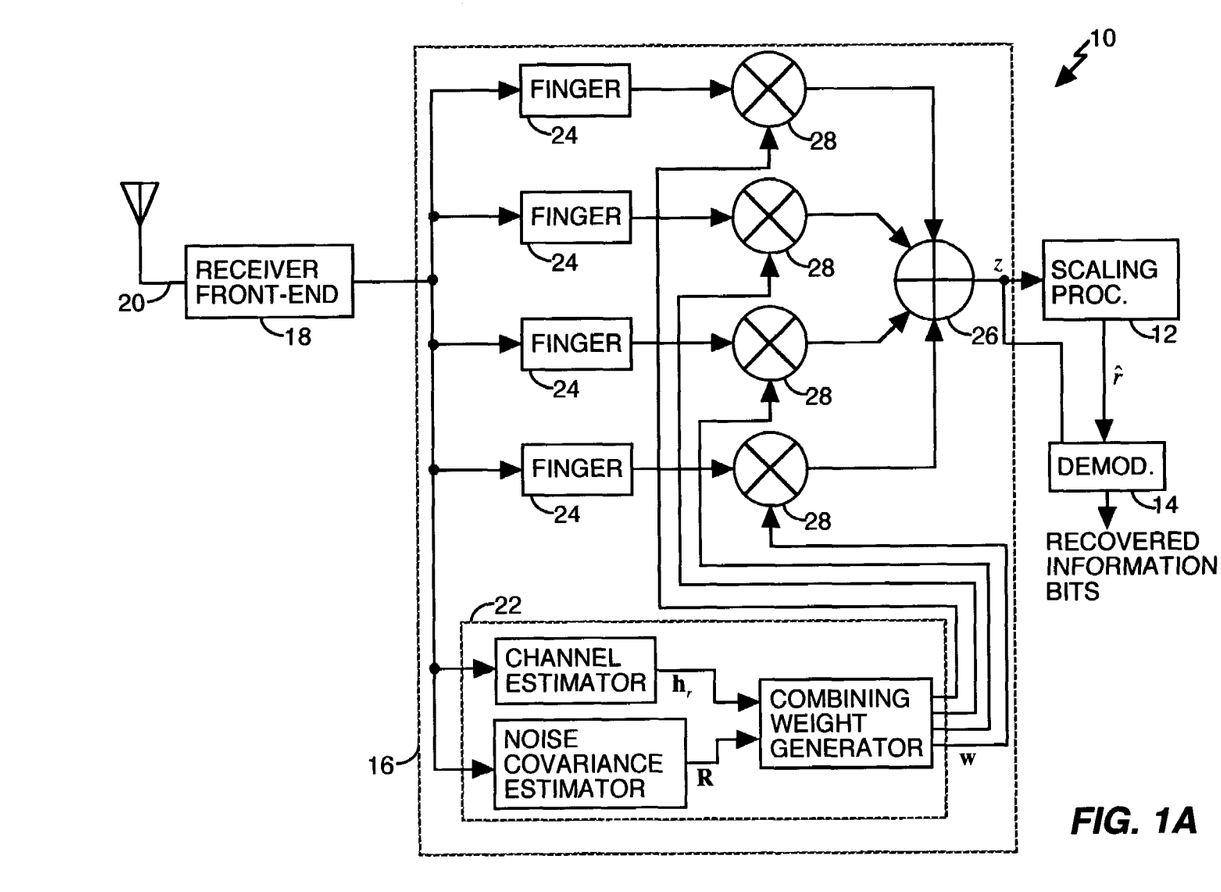
FIGS. 1A and 1B are diagrams of exemplary receivers according to the present invention.
Figure 1B:
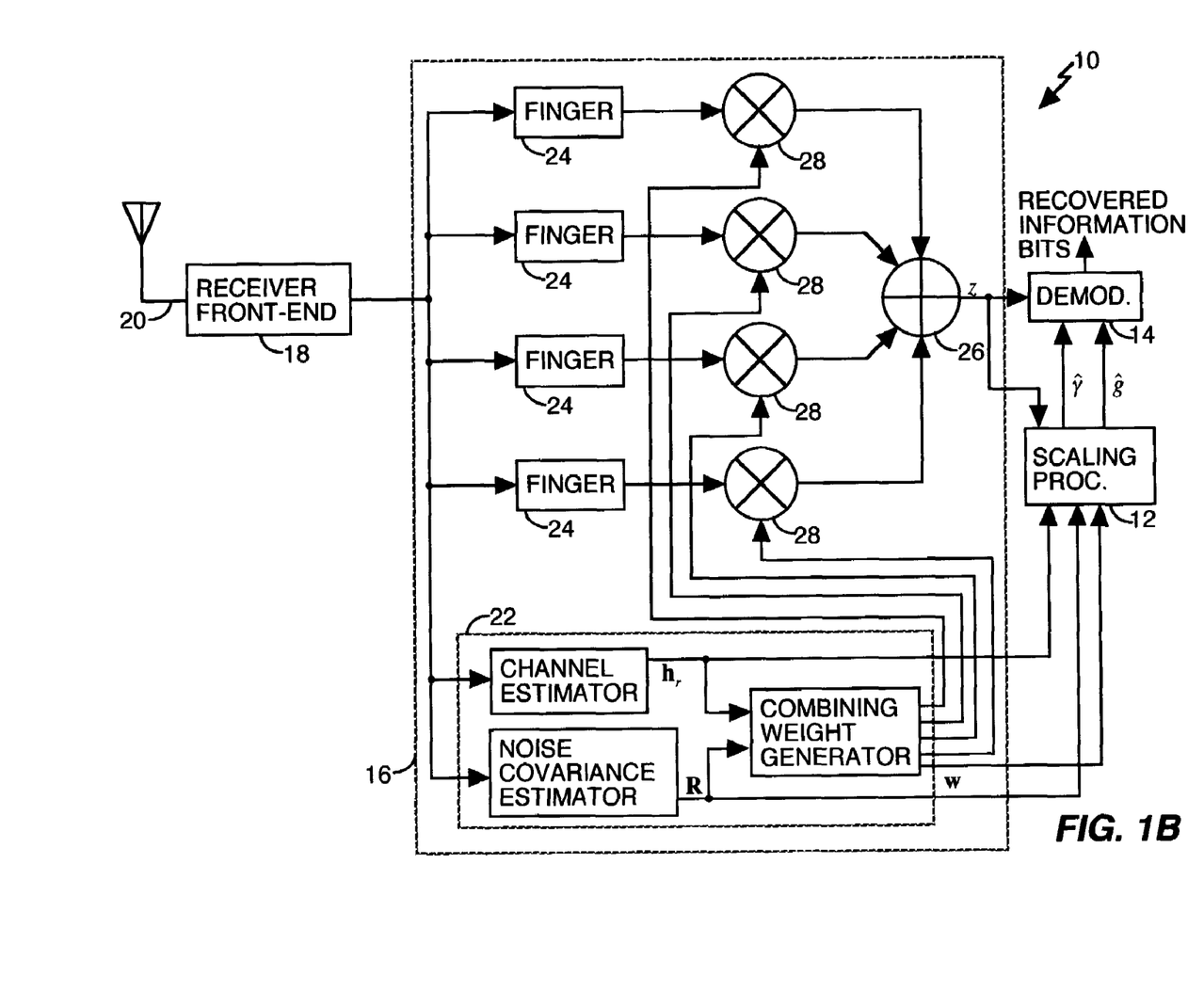

FIGS. 1A and 1B depict exemplary wireless communication receivers comprising a receiver circuit 10 in which one or more embodiments of the present invention may be implemented. Receiver circuit 10 comprises one or more processing circuits, and such processing circuits can comprise a scaling processor 12, a demodulator 14, and a RAKE receiver 16. The receiver circuit 10 further can comprise a radio "front-end" 18, which may be coupled to an antenna assembly 20. All or only a portion of the receiver circuit's processing circuits may be implemented on one or more Integrated Circuit (IC) devices. For example, at least the scaling processor 12 may be implemented as part of a digital logic circuit embodied in hardware, software, or some combination thereof. Of course, it should be understood that demodulator 14, RAKE receiver 16, etc., all may be individually or collectively implemented in one or more processing circuits.

In operation, transmitted data and reference signals are received via antenna 20 and coupled into front-end 18, where they are filtered, amplified, and down-sampled as needed or desired, such that RAKE receiver 16 receives sampled data streams for the received signals. Typically, the received signals comprise one or more signal images as the result of multipath propagation. Generally, each signal image differs in terms of its relative arrival time, and in terms of the phase and amplitude distortions.

An exemplary RAKE receiver 16 comprises a RAKE processor 22, a plurality of RAKE fingers 24 that provide despread values, a plurality of multipliers 28, each applying a RAKE combining weight to each finger output signal, and a combining circuit 26 that combines the weighted despread values to form RAKE combined values (a RAKE combined signal). RAKE processor 22 includes (or is associated with) searching and channel estimation circuits that identify multipath components of the received signal(s), and further includes control logic for time-aligning each RAKE finger 24 with a selected delay path of the received signal. For example, an exemplary RAKE processor 22 comprises a channel estimator 30, a noise covariance estimator 32, and a combining weight generator 34. In one or more exemplary embodiments, the combining weight generator 34 generates RAKE combining weights based on estimated channel impulse response(s) and a noise covariance matrix R. However, it should be understood that the combining weights may be determined by the estimated channel responses independent of the noise covariance matrix. Note that the channel response and covariance are determined from the reference signal, which may have a different received amplitude than the data signal, and thus the scaling factor can account for such differences.

Regardless, each RAKE finger 24 may be aligned with a different signal image for the received data signal, such that it generates a despread output signal for that signal image. Each of the despread finger output signals are RAKE combined in RAKE combiner 26 according to a set of RAKE combining weights applied by weighting circuits 28 to form a RAKE combined signal for demodulation by demodulator 14. An exemplary RAKE combined signal comprises recovered information symbols, which may be embodied as sequences of "soft" symbol values that are provided to the demodulator 14 for recovery of the transmitted information bits corresponding to those recovered symbols. It should be understood that this description of RAKE receiver 16 is exemplary rather than limiting.

For a given received data signal of interest, RAKE receiver 16 provides demodulator 14 with sequences of recovered information symbols, which are then demodulated by demodulator 14. To this end, scaling processor 12 determines a scaling factor that improves demodulation effectively by scaling the demodulation process to account for the received amplitude of the desired data signal. As such, the scaling processor 12 may cooperate with either or both the RAKE processor 22 and the demodulator 14. Generally, scaling the demodulation process comprises scaling amplitude information in the information symbols recovered from the RAKE combined data signal, or by scaling nominal symbol values (predefined modulation constellation points) for scaled demodulation of the recovered information symbols.

Discussion of exemplary scaling operations adopts the following notation:
 h—channel response for the desired signal (e.g., the data signal), one element per assigned RAKE finger 24;
 $h_r$—channel response for the reference signal (e.g., the pilot signal/symbols associated with the desired signal), one element per assigned RAKE finger 24—note that $h_r$ may be assumed to be ideal although the channel estimates generated from the received reference signal in fact may be imperfect;
 y—despread values obtained from the desired signal, one element per assigned RAKE finger 24;
 w—RAKE combining weights used for RAKE combining the despread output signals from the RAKE fingers 24, one element per assigned RAKE finger 24;
 R—noise covariance between the RAKE fingers 24 assigned to the desired signal;
 g—channel gain difference in amplitude between the desired signal and the reference signal, thus $h = g \, h_r$; and
 z—the RAKE combined signal output by RAKE combiner 26, e.g., the symbol sequences recovered from desired signal.

Figure 2A:
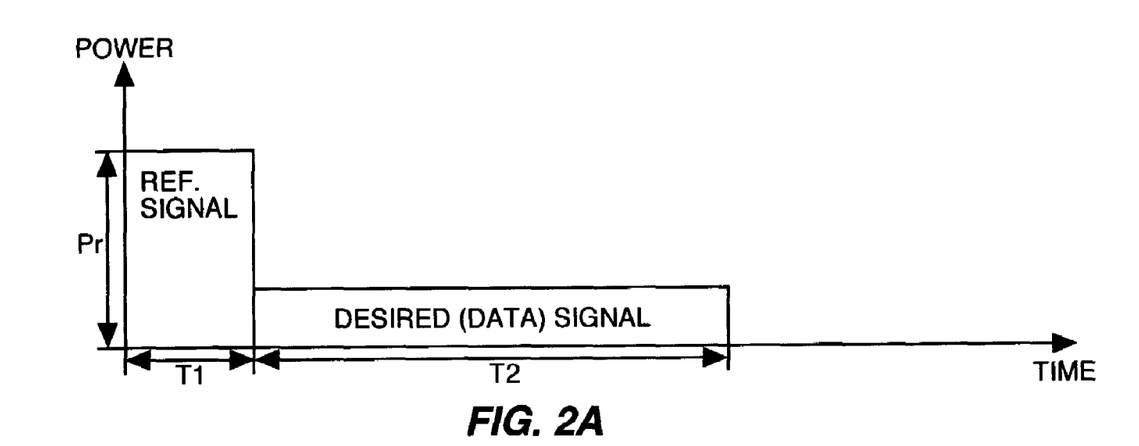
FIGS. 2A and 2B are diagrams of exemplary desired and reference signals.
Figure 2B:
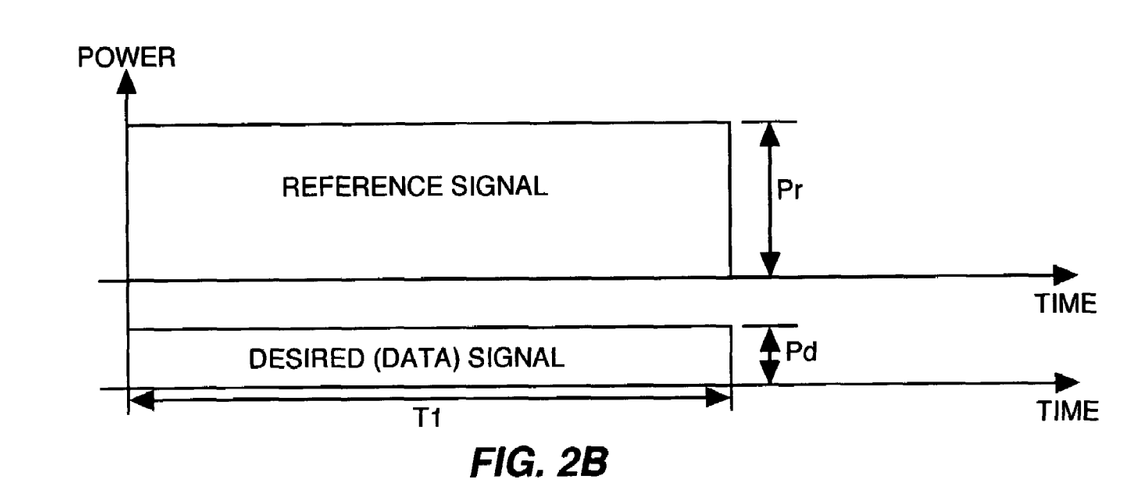

FIGS. 2A and 2B illustrate two exemplary arrangements for transmitting a reference signal in association with desired signal. In the first graph, one sees that the reference and desired signals are time multiplexed such that receiver circuit 10 receives the reference signal over a first time interval (T1), and receives the desired signal over a second time interval (T2). These intervals may or may not be contiguous but they usually are repeated on a regular, periodic basis so that the receiver circuit 10 can maintain updated channel estimates based on regularly receiving the reference signal. In the second graph, one sees that the reference and desired signals are transmitted simultaneously such that receiver circuit 10 receives the signals together.

In one or more exemplary embodiments, the desired signal is a data channel signal, such as a traffic or control channel, and the reference signal is a pilot channel signal, pilot symbols, and/or training sequence conveyed within or along with the desired signal. Thus, in one or more exemplary embodiments, the desired signal is an amplitude modulated data signal in a CDMA-based communication network, such as in IS-2000 or WCDMA wireless communication networks. The High Speed-Downlink Shared Channel (HS DSCH) signal defined by "Release 5" of the developing 3GPP WCDMA standards, which may be modulated using 16QAM, represents just one of the many amplitude modulated signals that may be advantageously demodulated according to one or more embodiments of the present invention.

Figure 3:
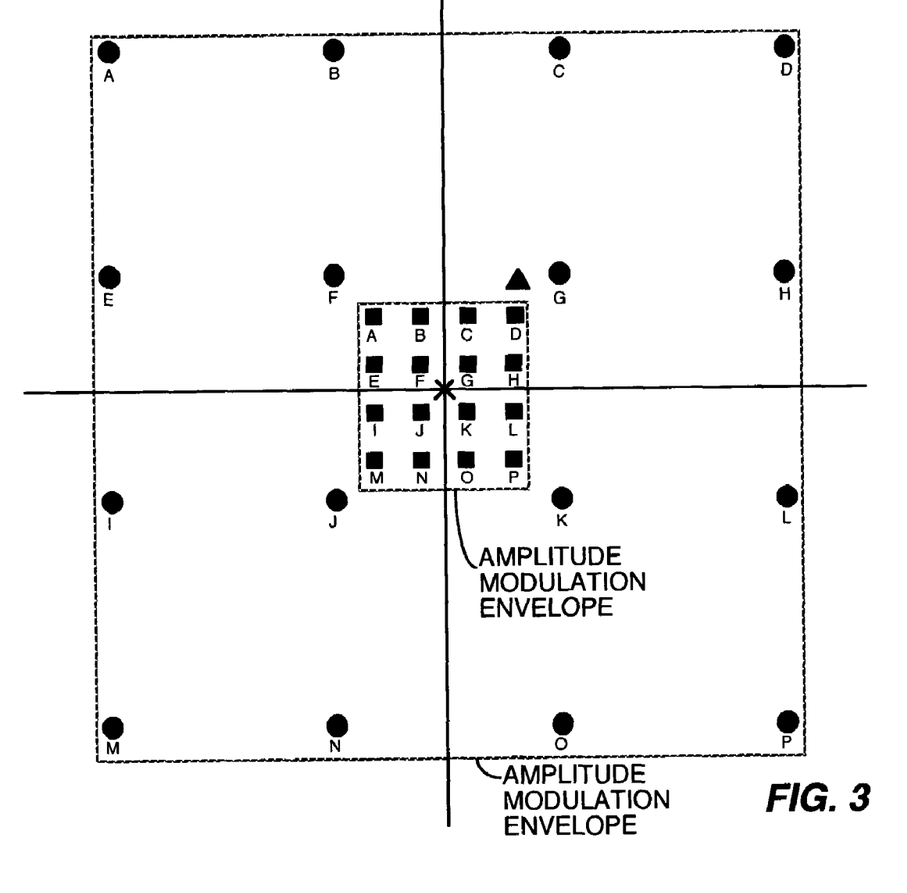
FIG. 3 is a diagram of two exemplary modulation constellations, each having a different amplitude envelope.

FIG. 3 provides an illustration of exemplary 16QAM symbol constellations, with constellation points A-P belonging to a first 16QAM constellation represented as a set of "squares" and constellation points A-P belonging to a second 16QAM constellation represented as a set of "circles." Note than an "x" represents a center point of both constellations and thus one sees that the two constellations differ only in terms of their amplitude "envelopes."

That is, the first constellation has a relatively small maximum amplitude, such that its sixteen constellation points are regularly spaced at relatively short distances around the amplitude origin. (Here, distance equates to amplitude and angle equates to phase.) The second constellation has the same relative positioning of constellation points but has an obviously larger amplitude envelope—the points in the second constellation are spaced further apart but occupy the same relative amplitude positions within the constellation.

Thus, one sees the potential difficulties in deciding whether a received data signal symbol—represented as a "triangle" in FIG. 3—was intended to correspond to constellation point "D" in the first constellation or to point "G" in the second constellation. By exemplary operation of the present invention, the received symbols and/or the nominal symbols in a reference constellation known to the receiver circuit 10 are adjusted based on a scaling factor to minimize, or otherwise reduce, demodulation errors that would otherwise arise from the unknown received amplitude (constellation envelope) of the desired signal. Thus, with respect to this particular example, the receiver circuit 10 more reliably determines whether the transmitted symbol belongs to the first or second constellations. However, it should be understood that many constellation envelopes are possible and the present invention is not limited to any particular number or range of possible received signal amplitudes.

Figure 4:
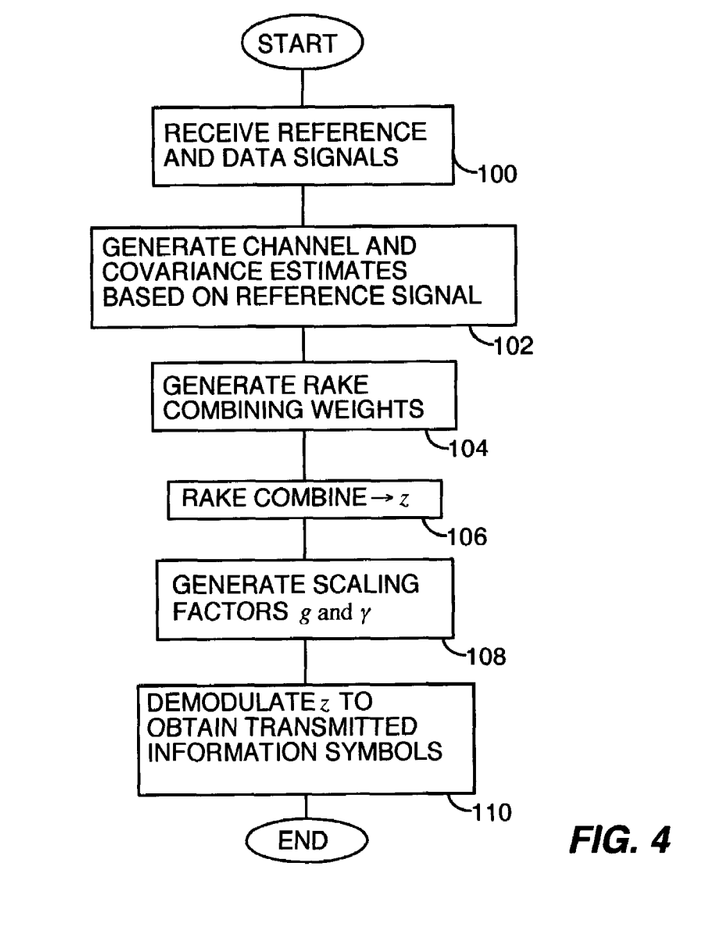
FIG. 4 is a diagram of exemplary processing logic according to one or more embodiments of the present invention.
Figure 5:
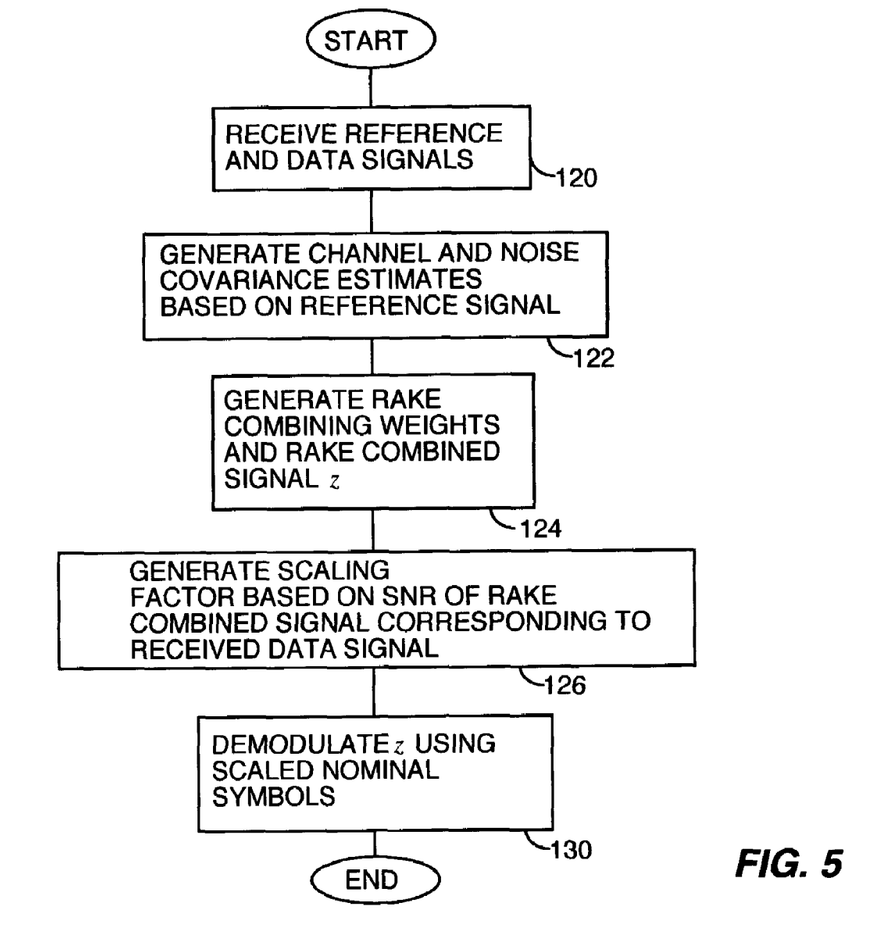
FIG. 5 is a diagram of exemplary processing logic according to one or more embodiments of the present invention.

FIGS. 4 and 5 outline processing logic for two exemplary embodiments of the present invention, and it should be noted that such processing may be implemented in receiver circuit 10 based on discrete or integrated logic circuits, and may be embodied in hardware, software, or some combination thereof. For example, receiver circuit 10 may include one or more memory devices, or other computer readable medium, to store program instructions embodying a computer program configured to implement one or more embodiments of the present invention. Note, too, that while FIGS. 4 and 5 apparently illustrate serial processing steps, the present invention is not limited to the illustrated process order, nor is it limited to serial sequencing of the illustrated operations.

In FIG. 4, processing begins with reception of the subject reference and desired signals (Step 100). While multiple desired signals may be received and processed according to the present invention, the illustration depicts a single desired signal for clarity of the discussion. RAKE receiver 16 estimates the radio channel for the desired signal based on the reference signal. In an exemplary embodiment, RAKE processor 22 includes, or is associated with, a channel estimator that obtains channel estimates for one or more delay paths of the desired signal (Step 102). RAKE processor 22 aligns one or more RAKE fingers 24 with these delay paths by, for example, controlling the "code offset" of the psuedo-noise (PN) sequence used by RAKE fingers 24 to despread the desired signal. Of course, time delay buffering or other delay path matching techniques may be used to align the RAKE fingers 24. The generated channel estimates, which may comprise a vector of complex coefficients (magnitude and phase values), representing the radio channel response $h_r$.

RAKE processor 22 further includes, or is associated with, a combining weight generator to generate the RAKE combining weights w, which are used to RAKE combine the despread signals output by the RAKE fingers 24 (Step 104). According to one embodiment of the present invention, the scaling processor 12 provides a scaling factor as gain adjustment value used to scale the amplitude of the RAKE combined signal. As such, RAKE processor 16 may scale the combining weights by the scaling factor provided by scaling processor 12 (Step 106). With this approach, the recovered information symbols, z, output by RAKE combiner 26 are scaled in amplitude before feeding into demodulator 14 for demodulation (Step 108). Therefore, while demodulation is based on the scaling factor, the actual scaling is performed in advance of the demodulator 14 by operating on the RAKE combined signal z.

FIG. 5 illustrates an alternate exemplary embodiment, wherein a scaling factor is applied by demodulator 14 as part of demodulation operations. Processing begins with reception of the reference and desired signals (Step 120). As before, channel estimates are generated based on the reference signal (Step 122), and combining weights are generated for RAKE combining the finger outputs to form the RAKE combined signal (Step 124). However, in this embodiment, the scaling factor is implicitly determined according to the SNR of the received signal, e.g., the SNR of recovered symbols in the RAKE combined signal (Step 126). Thus, the demodulator 14 implicitly applies the scaling factor in its demodulation operations by scaling a reference constellation according to the calculated SNR (Step 128). These and other operations are explained in much greater detail below.

In the context of 16QAM, and with the above exemplary methods in mind, one lets desired information bits ($b_0$, $b_1$, . . . , $b_{M-1}$) be mapped for signal transmission into one QAM symbol, i.e., mapped into a unique point within a QAM constellation. (For 16QAM, M=4.) Then, in terms of demodulating the information bits from QAM symbols, the Log-Likelihood Ratio (LLR) for bit $b_j$ is given by, $$LLR(b_j) = \ln \frac{\sum_{s_i \in S_0(j)} \exp\left\{\gamma\left(2\text{Re}\left(\frac{s_i^* z}{w^H h}\right) - |s_i|^2\right)\right\}}{\sum_{s_i \in S_1(j)} \exp\left\{\gamma\left(2\text{Re}\left(\frac{s_i^* z}{w^H h}\right) - |s_i|^2\right)\right\}}, \quad (1)$$

where $S_1(j)$ is the set of symbols mapped from $b_j$=1, where l=1 or 0, and where γ is recovered symbol SNR after RAKE combining. Thus, the numerator's value is determined as a function of nominal symbols, $s_i$, in the reference constellation having $b_j$ as a "0", while the denominator's value is determined as a function of nominal symbols, $s_i$, in the reference constellation having $b_j$ as a "1".

Further, the SNR, γ, of the RAKE combined signal z may be expressed as, $$\gamma = \frac{w^H h h^H w}{w^H R w}, \quad (2)$$

There, by application of the log-max principle, one arrives at, $$LLR(b_j) = \quad (3)$$

$$\gamma\left[\max_{s_i \in s_0(j)}\left(2\text{Re}\left(\frac{s_i^* z}{w^H h}\right) - |s_i|^2\right) - \max_{s_i \in s_1(j)}\left(2\text{Re}\left(\frac{s_i^* z}{w^H h}\right) - |s_i|^2\right)\right],$$

where h is, as previously noted, the radio channel response for the desired signal. By substituting an appropriately scaled version of the reference signal's radio channel response, one arrives at the following expression, $$LLR(b_j) = \gamma\left[\max_{s_i \in s_0(j)}\left(2\text{Re}\left(\frac{s_i^* z}{gw^H h_r}\right) - |s_i|^2\right) - \max_{s_i \in s_1(j)}\left(2\text{Re}\left(\frac{s_i^* z}{gw^H h_r}\right) - |s_i|^2\right)\right]. \quad (4)$$

Thus, in Eq. 4, $gh_r$ has been substituted for the desired signal's radio channel response h, wherein $h_r$ may be generated as channel estimates obtained from the received reference signal.

In looking at this substitution, it is noted that the despread values, y, from the RAKE fingers 24 may be expressed as, $$y=hs+n, \therefore y=gh_r s+n. \quad (5a)$$

Thus, the RAKE combined signal, z, may be expressed as, $$z=w^H y, \therefore z=gw^H h_r s+w^H n. \quad (5b)$$

With the above expressions in mind, then if the optimal combining weights $w=R^{-1}h$ are used, the LLR of $b_j$ may be expressed as, $$LLR(b_j) = \max_{s_i \in s_0(j)}(2\text{Re}(s_i^* z) - |s_i|^2 \gamma) - \max_{s_i \in s_1(j)}(2\text{Re}(s_i^* z) - |s_i|^2 \gamma). \quad (6)$$

From Eq. (6), one sees that demodulator 14 may implement LLR demodulation of the RAKE combined signal, z, by implicit application of a scaling factor. That is, the scaling factor is embodied implicitly in the calculated SNR, γ, which is applied to nominal symbol values, $s_i$, that belong to a reference constellation known to receiver circuit 10.

In other words, the exemplary receiver circuit 10 demodulates the RAKE combined signal based on computing "distances" between the recovered symbols in z and implicitly scaled reference symbols, whose amplitudes are adjusted based on computing γ. To that end, the RAKE combined signal may be expressed as, $$z = \gamma s + u', \tag{7}$$

where u' represents a noise term having a variance γ. Ignoring the noise term and utilizing the assumption that the reference constellation has unit power leads to the following expression for an estimate of γ, $$\hat{\gamma} = \sqrt{E[|z|^2]}. \tag{8}$$

Note that Eq. 8 represents an "average" value averaged over time, or averaged over multiple code channels, or both. That is, where the receiver circuit 10 receives multiple CDMA encoded channels, the average may be developed utilizing samples taken over two or more code channels.

Regardless, with the above expressions in mind, the log-likelihood function reduces to the following expression, $$LLR(b_j) = \max_{s_i \in s_0(j)} \left( 2\mathrm{Re}(s_i^* z) - |s_i|^2 \sqrt{E[|z|^2]} \right) - \max_{s_i \in s_i(j)} \left( 2\mathrm{Re}(s_i^* z) - |s_i|^2 \sqrt{E[|z|^2]} \right). \tag{9}$$

With Eq. (9), then, the demodulator 14 obtains the log-likelihood ratio of the originally transmitted information bits from the recovered symbols in the RAKE combined signal z based comparing the distances between the received symbol values and corresponding (adjusted) nominal symbol values in the reference constellation.

More particularly, the first term in Eq. (9) finds the minimum distance metric between the recovered symbol value and all nominal symbol values, $s_i$, having the jth bit as "0", while the second term finds the minimum distance metric between the recovered symbol value and all nominal symbol values, $s_i$, having the jth bit as "1". Here, the nominal symbol values are amplitude-scaled by the estimated SNR $\hat{\gamma}$, which may be calculated by scaling processor 12 and provided to demodulator 14. Therefore, demodulator 14 improves its demodulation accuracy by computing distance terms that implicitly consider the received signal amplitude of the desired signal. As such, Eq. (9) represents an exemplary expression for use in the processing logic of FIG. 5, although it should be understood that FIG. 5 does not represent a limiting application of this embodiment.

Alternatively, as mentioned in the context of FIG. 4, scaling processor 12 may explicitly calculate the scaling factor for use either by RAKE receiver 16 or by demodulator 14. Eq. (10) below provides an exemplary expression whereby an explicit gain factor is calculated. From Eqs. (5a) and (5b), for any arbitrary combining weights w, a gain factor g may be estimated by averaging the magnitude squares of the RAKE combined values received over a given time interval (e.g., a defined coding unit, a frame, a slot, etc.) based on, $$E[|z|^2] = g^2 |w^H h_r|^2 E[|s|^2] + w^H R w. \tag{10}$$

Eq. (10) may be further simplified by assuming that the nominal symbol s is pseudo-random and has a second moment equal to "1", e.g., $E[|s|^2] = 1$. Thus, $$E[|z|^2] = g^2 |w^H h_r|^2 + w^H R w. \tag{11}$$

With Eq. (11) as the basis, the explicit gain factor g, which relates the received amplitudes of the desired signal and the reference signal, may be found according to the following expression, $$g = \sqrt{\frac{E[|z|^2] - w^H R w}{|w^H h_r|^2}}. \tag{12}$$

Thus, the scaling factor may be based on the desired signal, the RAKE combining weights, the reference channel response (e.g., channel estimates), and the RAKE finger noise covariance. After solving for g, the estimated SNR may be found as, $$\hat{\gamma} = \hat{g}^2 \frac{|w^H h_r|^2}{|w^H R w|}. \tag{13}$$

With g and $\hat{\gamma}$, soft values of QAM modulated bits may be generated according to Eq. (4), for example. If only the diagonal elements of the noise covariance matrix are available, R in Eqs. (12) and (13) may be replaced by diag(R). Diagonal values are available, for example, where the noise power for each RAKE finger 24 is tracked, but where noise correlations between RAKE fingers 24 is not tracked.

Also, wherein the RAKE combined signal z is obtained using a GRAKE embodiment of receiver circuit 10, wherein the combining weights w are based on $h_r$ and R (e.g., $w = R^{-1} h_r$), then the symbol SNR for z may be more efficiently calculated as, $$\hat{\gamma} = \hat{g}^2 w^H h_r. \tag{14}$$

In another exemplary embodiment, calculations may be simplified further by ignoring the noise term in Eq. (12), which yields, $$g = \sqrt{\frac{E[|z|^2]}{|w^H h_r|^2}}. \tag{15}$$

To obtain the estimated SNR in accordance with the above assumption, the noise covariance matrix R may be approximated by an identify matrix, which yields the following exemplary calculation, $$\hat{\gamma} = \hat{g}^2 \frac{|w^H h_r|^2}{|w|^2}. \tag{16}$$

Note that if the scaling processor 12 estimates SNR in accord with Eq. (16), the noise term essentially is ignored and the estimated SNR thus may be off by a corresponding amount. However, any such estimation errors will not result in degraded block error rates where the log-max demodulation algorithm is used in Turbo decoding.

In another exemplary embodiment, the exemplary receiver circuit 10 first may obtain a working value for s according to any of the foregoing embodiments, and then refine that value in one or more subsequent iterations. An exemplary iteration expression is given as, $$E[zs^*] = gw^H h_r E[ss^*] + w^H E[n]E[s^*], \quad (17a)$$

which reduces to, $$E[zs^*] = gw^H h_r. \quad (17b)$$

With Eq. (18), then, g may be estimated as, $$\hat{g} = \frac{E[|zs^*|]}{w^H h_r}. \quad (18)$$

Thus, as noted, s* is needed to determine ĝ, which in turn is needed to obtain an initial working value for s. Therefore, scaling processor 12 may carry out any one of the earlier embodiments to obtain a first estimate of s (i.e., ŝ) and then use ŝ* in Eq. (18) above to refine the estimate of the scaling factor g. The refined scaling factor g may be used in a new demodulation process to improve the LLR estimates of bits. As such, scaling processor 12 may cooperate with demodulator 14 in one or more successive demodulations, i.e., perform one, two, or more iterative demodulations. For the symbol SNR, either Eq. (13) or Eq. (16) may be used, depending on the particular implementation of demodulator 14 used in the initial demodulation attempt.

Additional exemplary details associated with practicing one or more embodiments of the present invention involve the selection of time periods over which to perform the above calculations. That is, determination of an appropriately valued scaling factor to aid demodulation of the desired signal is a dynamic process that generally should account for real-world characteristics of wireless signal reception. For example, signal fading is a commonly understood phenomenon wherein the amplitude of a received signal varies in concert with changing attenuation characteristics and/or changing propagation paths. Thus, one or more embodiments of the present invention recalculate the scaling factor (either explicitly as g or implicitly as $\hat{\gamma}$) within each one of one or more relatively short time intervals. Nominally, the time interval over which a given scaling factor is applied in demodulation is short enough that fading variations of the desired signal are minimal over the interval.

Figure 6:
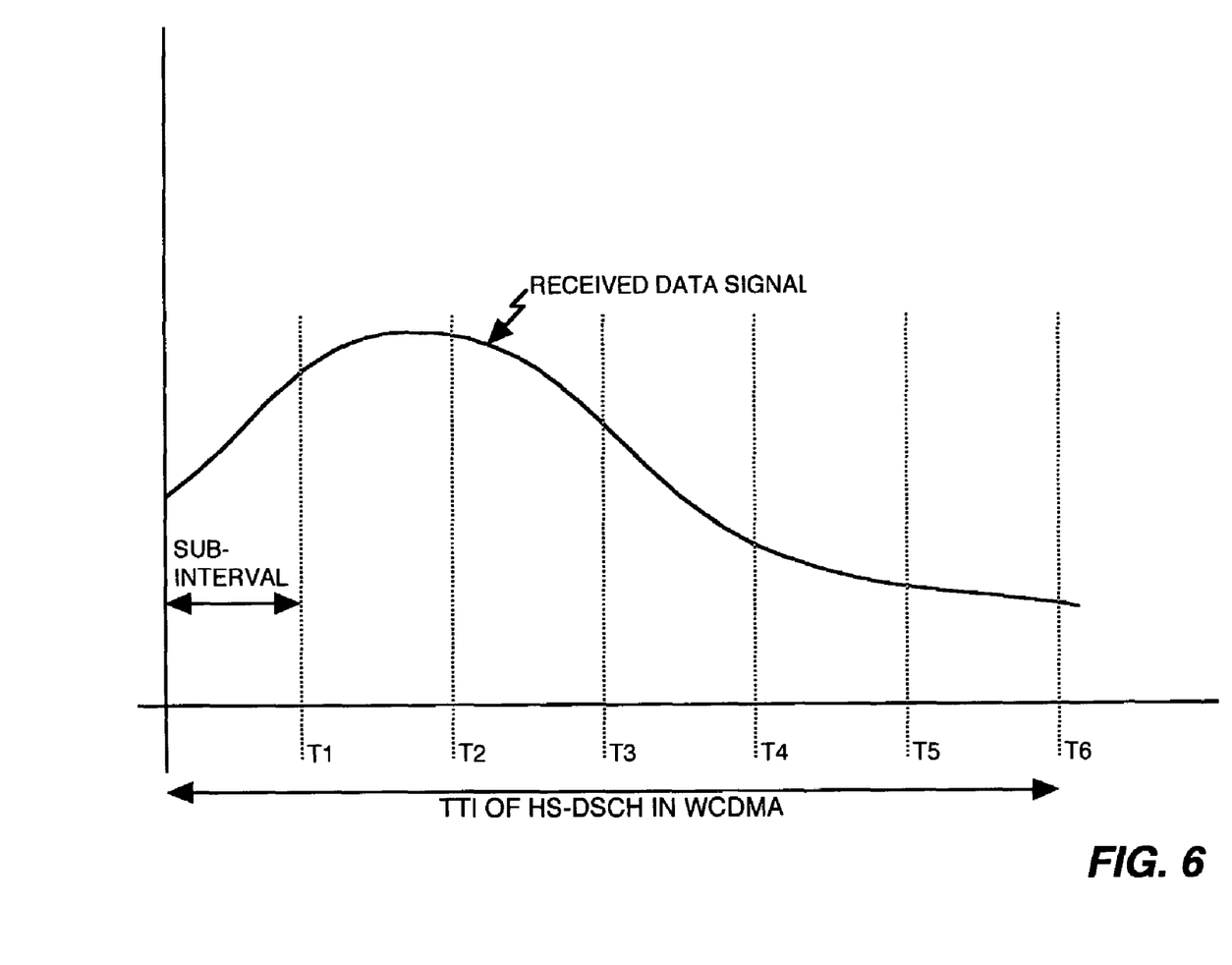
FIG. 6 is a diagram of exemplary sub-interval time divisions to combat signal fading.

FIG. 6 illustrates an exemplary embodiment in the context of one Transmit Time Interval (TTI) of a HS-DSCH signal as used in WCDMA-based systems. It should be understood that this example is non-limiting. In the diagram, the HS-DSCH signal experiences fading variations over the full TTI interval, but experiences significantly reduced fading variations within each of six subintervals. Thus, the exemplary scaling processor 12 may recalculate the scaling factor in each one of these subintervals to avoid fading-induced scaling errors.

Figure 7:
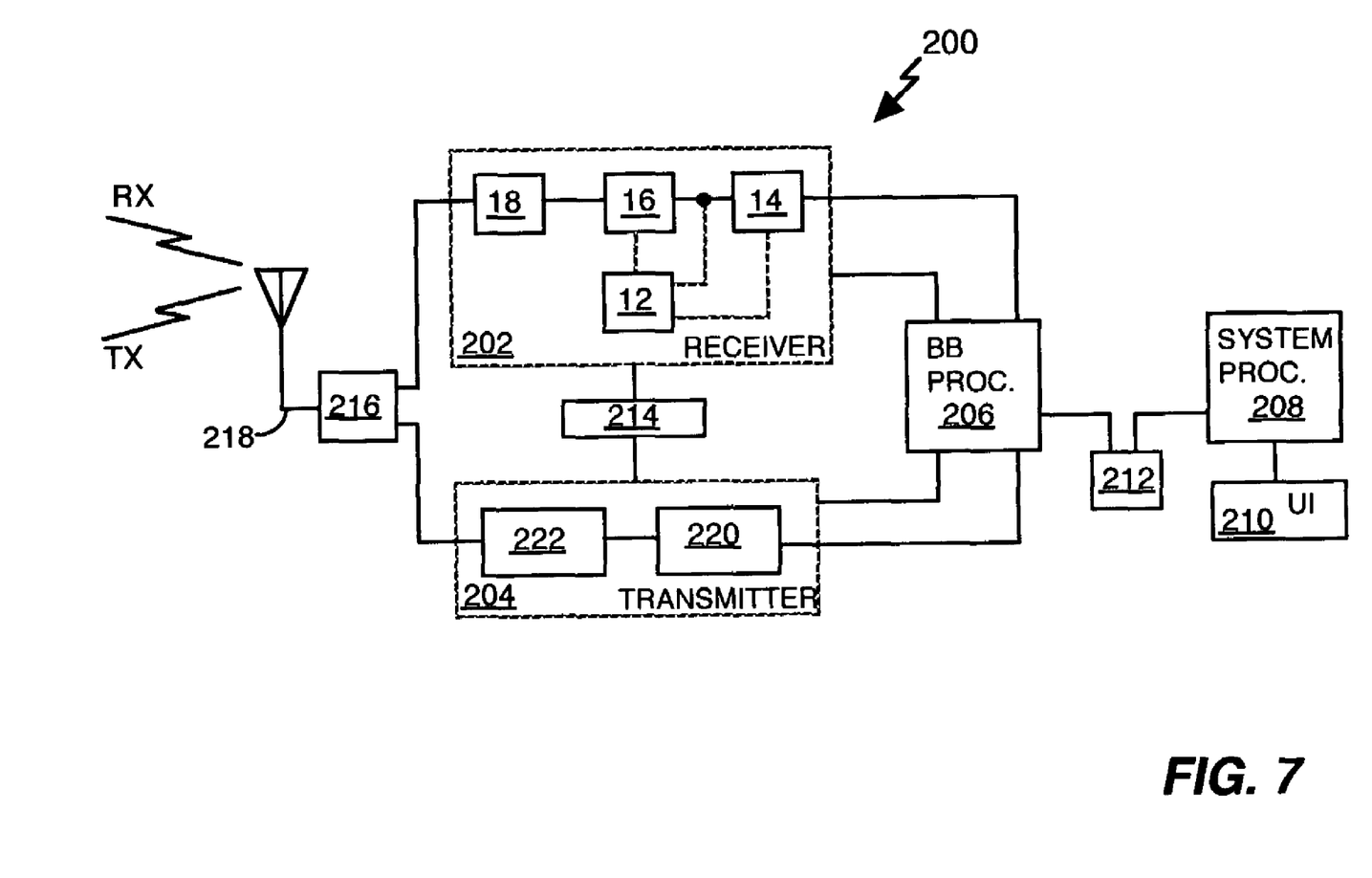
FIG. 7 is a diagram of an exemplary mobile terminal according to the present invention.

FIG. 7 illustrates an exemplary mobile terminal 200 in which the exemplary receiver circuit 10 may be implemented. The term "mobile terminal" as used herein is given broad construction and the term thus encompasses, but is not limited to, cellular radiotelephones, Personal Communication Services (PCS) terminals, Portable Digital Assistants (PDAs), laptop, palmtop or other types of computers that include wireless transceivers, or other appliance that includes a wireless transceiver. Mobile terminals also may be referred to as "pervasive computing" devices.

In any case, the illustrated mobile terminal 200 comprises a receiver 202, a transmitter 204, a baseband processor 206, a system processor 208 and associated user interface 210, one or more memory devices 212, a frequency synthesizer 214, a duplexer/switch circuit 216, and a combined receive/transmit antenna assembly 218. Receiver 202 comprises the previously described scaling processor 12, demodulator 14, and RAKE receiver 16 in accordance with one or more of the aforementioned exemplary embodiments. An exemplary transmitter 204 comprises a transmit modulator 220 and a power amplifier circuit 222. Note that elements of receiver 202 may be integrated in whole in or in part in baseband processor 206. The scaling processor 12, demodulator 14, and RAKE receiver 16 may be implemented functionally in one or more signal processing circuits within baseband processor 206 based on, for example, stored program instructions executed by baseband processor 206.

Of course, it should be understood that the architecture of mobile terminal 200 may vary widely depending on its intended use and on its implemented features. However, the exemplary mobile terminal 200 advantageously employs a scaling factor in its demodulation of received amplitude modulate signals. As such, those skilled in the art will recognize that the exemplary receiver circuit 10 may be used in a variety of other wireless communication devices or systems, such as in the receiver circuits of a Radio Base Station (RBS), which also may be referred to as a Base Transceiver Station (BTS).

Broadly, then, a receiver according to an exemplary embodiment of the present invention comprises a processing circuit to determine the scaling factor for the data signal. To this end, the processing circuit can comprise a scaling processing, and may further comprise a demodulator and a RAKE receiver. The RAKE receiver may be configured as a Generalized RAKE (GRAKE) receiver. In an exemplary embodiment, the scaling processor generates the scaling factor as an amplitude gain factor applied to recovered information symbols obtained from the data signal during RAKE despreading operations. With this embodiment, recovered information symbols in the RAKE combined signal are scaled, e.g., amplitude adjusted, in advance of symbol demodulation. Note that these recovered information symbols may or may not be "soft" symbol values.

In an alternative exemplary embodiment, the recovered information symbols are not scaled in advance of demodulation. Instead, the nominal symbols of a reference constellation are scaled as part of the demodulation process. For example, a Log-Likelihood Ratio (LLR) demodulation operation evaluates the distance, e.g., a Euclidean distance metric, between each recovered symbol and the closest symbol(s) in the reference constellation. Thus, the scaling factor effectively is used to "scale" the reference constellation in accord with the transmitted power and/or received amplitude of the data signal.

Thus, demodulation of the received data signal is based on the scaling factor, but that scaling factor may be applied as part of RAKE processing for subsequent benefit during demodulation of the RAKE combined signal, or may be applied directly during demodulation operations. Further exemplary variations involve generation of the scaling factor itself. For example, the scaling factor may be determined and applied explicitly or implicitly. In an exemplary embodiment based on explicit determination, the scaling factor may be calculated based on, for example, the average symbol power of recovered information symbols in the RAKE combined signal, the RAKE combining weights, the reference channel response, and the noise covariance between fingers of the RAKE receiver.

So determined, the scaling factor may be applied to the RAKE combined values to provide the amplitude scaling necessary for reliable demodulation. That is, the recovered symbols may be adjusted in amplitude to move the symbols closer to their true amplitudes such that each symbol lies on, or at least closer to, the nominal symbol locations in a reference constellation. Thus, the recovered information symbols are scaled according to the amplitude modulation envelope of the data signal as represented by the scaling factor.

Therefore, the present invention is not limited by the foregoing discussion, which provides details regarding exemplary embodiments of the present invention. Indeed, the present invention is limited only by the scope of the foregoing claims and by their reasonable equivalents.

What is claimed is:

1. A wireless communication receiver comprising:
   a front-end circuit to receive an amplitude modulated data signal and an associated reference signal, wherein a transmit power of the data signal is unknown to the receiver; and
   a processing circuit to determine a scaling factor based on the reference and data signals for demodulating the data signal, wherein the scaling factor relates received amplitudes of the data and reference signals;
   said processing circuit comprising a scaling processor configured to generate the scaling factor as a function of an amplitude modulation envelope of the data signal such that the processing circuit can determine distance metrics relating constellation positions of each recovered information symbols to nominal symbol constellation positions.

2. The receiver of claim 1, wherein the processing circuit is configured to determine the scaling factor as an amplitude gain factor applied to recovered information symbols obtained from the data signal during RAKE despreading and combining operations, or applied to nominal symbol values used by the receiver in demodulating the recovered information symbols.

3. The receiver of claim 2, wherein the nominal symbol values comprise a set of predefined modulation constellation points.

4. The receiver of claim 2, wherein the receiver is configured to determine a channel impulse response estimate and noise covariance estimate from the reference signal.

5. The receiver of claim 4, wherein the RAKE combining operations comprise obtaining combining weights based on the channel impulse response estimate and the noise covariance estimate.

6. The receiver of claim 1, wherein the processing circuit further comprises a demodulator, and wherein the scaling processor is configured to generate a scaled signal by applying the scaling factor to a RAKE combined signal comprising the recovered information symbols, and wherein the demodulator is configured to demodulate the scaled signal.

7. The receiver of claim 1, wherein the processing circuit further comprises a demodulator, and wherein the scaling processor is configured to generate the scaling factor and the demodulator is configured to demodulate the recovered information symbols by applying the scaling factor to nominal symbol values corresponding to a defined amplitude modulation constellation.

8. The receiver of claim 1, wherein the processing circuit is configured to determine the scaling factor explicitly as a gain factor based on a gain difference in amplitude between the reference and data signals.

9. The receiver of claim 8, wherein the processing circuit generates a RAKE combined signal by despreading and RAKE combining the data signal, and applies the gain factor to the RAKE combined signal for demodulation of the RAKE combined signal.

10. The receiver of claim 1, wherein the processing circuit is configured to determine the scaling factor implicitly based on a Signal-to-Noise Ratio (SNR) of a RAKE combined signal derived from the data signal.

11. The receiver of claim 1, wherein the processing circuit determines the SNR of the data signal within a time period in which fading variations of the data signal are assumed to be minimal.

12. The receiver of claim 11, wherein the processing circuit determines the SNR over all parallel code channels transmitted during the time period.

13. The receiver of claim 1, wherein the processing circuit comprises one or more Integrated Circuit (IC) devices.

14. The receiver of claim 1, wherein at least the scaling processor is implemented as an Integrated Circuit (IC) device.

15. The receiver of claim 1, wherein the receiver comprises a Code Division Multiple Access (CDMA) receiver.

16. The receiver of claim 15, wherein the CDMA receiver comprises a Wideband CDMA (WCDMA) receiver, and wherein the processing circuit is configured to determine the scaling factor for a received High Speed-Downlink Shared Channel (HS-DSCH) signal as the received data signal.

17. A wireless communication receiver comprising:
   a front-end circuit to receive an amplitude modulated data signal and an associated reference signal, wherein a transmit power of the data signal is unknown to the receiver; and
   a processing circuit to determine a scaling factor based on the reference and data signals for demodulating the data signal, wherein the scaling factor relates received amplitudes of the data and reference signals;
   said processing circuit comprising:
      a scaling processor to generate the scaling factor and compensate a RAKE combined signal based on the scaling factor, wherein the scaling processor determines the scaling factor as a gain factor based on an average power of symbols in the RAKE combined signal, one or more RAKE combining weights used to form the RAKE combined signal, a reference signal channel response, and noise covariance between RAKE fingers of the RAKE receiver;
      a RAKE receiver to generate the RAKE combined signal by despreading and RAKE combining the data signal; and
      a demodulator to demodulate the RAKE combined signal.

18. The receiver of claim 17, wherein the demodulator compensates a nominal symbol constellation using the scaling factor as part of demodulating the RAKE combined signal.

19. A computer readable medium storing a computer program for instructing a receiver comprising:
   program instructions to determine a scaling factor relating an amplitude-modulated received data signal to an associated received reference signal, wherein a transmit power of the data signal is unknown to the receiver; and
   program instructions to demodulate the data signal based on the scaling factor;

said program instructions to determine the scaling factor comprising program instructions to determine the scaling factor as a gain factor based on an average power of symbols in the RAKE combined signal, one or more RAKE combining weights used to form the RAKE combined signal, a reference signal channel response, and noise covariance between RAKE fingers of a RAKE receiver providing the RAKE combined signal.

20. The computer readable medium storing a computer program of claim 19, wherein the program instructions to demodulate the data signal based on the scaling factor comprise one of program instructions to apply the scaling factor to recovered information symbols obtained from the data signal during RAKE despreading and combining operations, and program instructions to apply the scaling factor to nominal symbol values used by the receiver in demodulating the recovered information symbols.

21. The computer readable medium storing a computer program of claim 20, wherein the nominal symbol values comprise a set of predefined modulation constellation points.

22. The computer readable medium storing a computer program of claim 21, further comprising program instructions to determine a channel impulse response estimate and noise covariance estimate from the reference signal.

23. The computer readable medium storing a computer program of claim 22, wherein program instructions to perform the RAKE combining operations comprise obtaining combining weights based on the channel impulse response estimate and the noise covariance estimate.

24. The computer readable medium storing a computer program of claim 19, wherein the program instructions to determine the scaling factor comprise program instructions to the scaling factor explicitly as a gain factor based on a gain difference in amplitude between the reference and data signals.

25. The computer readable medium storing a computer program of claim 24, wherein the program instructions to demodulate the data signal based on the scaling factor comprise program instructions to apply the gain factor to a RAKE combined signal generated by despreading and RAKE combining the data signal, which is demodulated by the receiver.

26. The computer readable medium storing a computer program of claim 25, wherein the program instructions to determine the scaling factor comprise program instructions to determine the scaling factor implicitly based on a Signal-to-Noise Ratio (SNR) of the RAKE combined signal.

27. The computer readable medium storing a computer program of claim 19, further comprising program instructions to determine a SNR associated with the data signal within a time period in which fading variations of data signal are assumed to be minimal.

28. The computer readable medium storing a computer program of claim 27, wherein the program instructions to determine the SNR associated with the data signal comprise program instructions to determine a SNR over all parallel code channels transmitted to the receiver during the time period.

29. The computer readable medium storing a computer program of claim 27, wherein the data signal is a Wideband CDMA (WCDMA) High Speed-Downlink Shared Channel (HS-DSCH) signal, and further comprising program instructions to determine the time period as a subinterval of a Transmit Time Interval (TTI) of the HS-DSCH signal.

30. The computer readable medium storing a computer program of claim 19, wherein the program instructions to demodulate the data signal based on the scaling factor comprise program instructions to apply the scaling factor to a RAKE combined signal derived from the data signal, and then demodulate the RAKE combined signal.

31. The computer readable medium storing a computer program of claim 19, wherein the program instructions to demodulate the data signal based on the scaling factor comprise program instructions to scale a nominal symbol constellation using the scaling factor as part of demodulating the data signal.

32. A method of demodulating an amplitude modulated received data signal, wherein a transmit power of the data signal is unknown, the method comprising:
   determining a scaling factor for the data signal based on the data signal and a reference signal received in association with the data signal for estimating a radio channel of the data signal; and
   demodulating the data signal based on the scaling factor;
   wherein determining the scaling factor comprises determining a first scaling factor for a first iteration of symbol demodulation, and then using results from the first iteration of symbol demodulation to obtain an improved, second scaling factor for a second iteration of symbol demodulation.

33. The method of claim 32, wherein demodulating the data signal based on the scaling factor comprises scaling recovered information symbols obtained from the data signal and demodulating the scaled recovered information symbols.

34. The method of claim 32, wherein scaling recovered information symbols obtained from the data signal and demodulating the scaled recovered information symbols comprises calculating the scaling factor based on signal powers of the recovered information symbols.

35. The method of claim 32, wherein demodulating the data signal based on the scaling factor comprises scaling nominal symbol values used during demodulation of recovered information symbols obtained from the data signal.

36. The method of claim 35, wherein scaling nominal symbol values used during demodulation of recovered information symbols obtained from the data signal comprises determining a Signal-to-Noise Ratio (SNR) for the recovered information symbols and scaling the nominal symbol values by the SNR.

37. The method of claim 36, further comprising determining a new SNR in each of one or more time intervals in which fading variations of the data signal are minimal.

38. The method of claim 32, wherein determining a scaling factor for the data signal based on the data signal and a reference signal received in association with the data signal for estimating a radio channel of the data signal comprises determining the scaling factor as an amplitude gain factor applied to recovered information symbols obtained from the data signal during RAKE despreading and combining operations, or applied to nominal symbol values used by the receiver in demodulating the recovered information symbols.

39. The method of claim 38, further comprising storing a set of predefined modulation constellation points as the nominal symbol values.

40. The method of claim 38, further comprising determining a channel impulse response estimate and noise covariance estimate from the reference signal.

41. The method of claim 40, wherein the RAKE combining operations comprise obtaining combining weights based on the channel impulse response estimate and the noise covariance estimate.

42. A processing circuit for use in a wireless communication receiver, the processing circuit comprising:
- a scaling circuit to determine a scaling factor relating received amplitudes of an amplitude modulated data signal and a reference signal, wherein a transmit power of the data signal is unknown to the receiver; and
- a demodulator circuit to demodulate the data signal in accordance with scaled amplitude information that is based on the scaling factor;
- wherein the demodulator circuit is configured to scale nominal symbol values in a reference amplitude modulation constellation based on the scaling factor and to demodulate information symbols recovered from the data signal based on determining positions of the information symbols relative of the scaled nominal symbol values.

43. A processing circuit for use in a wireless communication receiver, the processing circuit comprising:
- a scaling circuit to determine a scaling factor relating received amplitudes of an amplitude modulated data signal and a reference signal, wherein a transmit power of the data signal is unknown to the receiver; and
- a demodulator circuit to demodulate the data signal in accordance with scaled amplitude information that is based on the scaling factor;
- wherein the scaling circuit is configured to generated scaled information symbols by scaling amplitudes of information symbols recovered from the data signal based on the scaling factor, and wherein the demodulator circuit is configured to demodulate the scaled information symbols by determining positions of the scaled information symbols relative to nominal symbol values in a reference amplitude modulation constellation.

44. A wireless terminal for use in a wireless communication network comprising:
- a transmitter to transmit signals to one or more network receivers; and
- a receiver to receive signals transmitted from one or more network transmitters;
- said receiver comprising:
  - a front-end circuit to receive an amplitude modulated data signal and an associated reference signal, wherein a transmit power of the data signal is unknown to the receiver; and
  - a processing circuit to determine a scaling factor based on the reference and data signals for demodulating the data signal, wherein the scaling factor relates received amplitudes of the data and reference signals;
  - said processing circuit comprising a scaling processor configured to generate the scaling factor as a function of an amplitude modulation envelope of the data signal such that the processing circuit can determine distance metrics relating constellation positions of each recovered information symbols to nominal symbol constellation positions.

45. The wireless terminal of claim 44, wherein the processing circuit is configured to determine the scaling factor as an amplitude gain factor applied to recovered information symbols obtained from the data signal during RAKE despreading operations, or applied to nominal symbol values used by the receiver in demodulating the recovered information symbols.

46. The wireless terminal of claim 44, wherein the processing circuit comprises a demodulator, and wherein the scaling circuit is configured to generate a scaled signal by applying the scaling factor to a RAKE combined signal comprising the recovered information symbols, and wherein the demodulator is configured to demodulate the scaled signal.

47. The wireless terminal of claim 44, wherein the processing circuit comprises a demodulator, and wherein the scaling circuit is configured to generate the scaling factor and the demodulator is configured to demodulate the recovered information symbols by applying the scaling factor to nominal symbol values corresponding to a defined amplitude modulation constellation.

48. The wireless terminal of claim 44, wherein the processing circuit is configured to determine the scaling factor explicitly as a gain factor based on a gain difference in amplitude between the reference and data signals.

49. The wireless terminal of claim 48, wherein the processing circuit generates a RAKE combined signal by despreading and RAKE combining the data signal, and applies the gain factor to the RAKE combined signal for demodulation of the RAKE combined signal.

50. The wireless terminal of claim 44, wherein the processing circuit is configured to determine the scaling factor implicitly based on a Signal-to-Noise Ratio (SNR) of a RAKE combined signal derived from the data signal.

51. The wireless terminal of claim 44, wherein the processing circuit determines the SNR of the data signal within a time period in which fading variations of the data signal are assumed to be minimal.

52. The wireless terminal of claim 51, wherein the processing circuit determines the SNR over all parallel code channels transmitted during the time period.

53. The wireless terminal of claim 44, wherein the processing circuit further comprises:
- a RAKE receiver to generate a RAKE combined signal by despreading and RAKE combining the data signal; and
- a demodulator to demodulate the RAKE combined signal.

54. The wireless terminal of claim 53, wherein the scaling processor compensates the RAKE combined signal based on the scaling factor.

55. The wireless terminal of claim 54, wherein the scaling processor determines the scaling factor as a gain factor based on an average power of symbols in the RAKE combined signal, one or more RAKE combining weights used to form the RAKE combined signal, a reference signal channel response, and noise covariance between RAKE fingers of the RAKE receiver.

56. The wireless terminal of claim 53, wherein the demodulator compensates a nominal symbol constellation using the scaling factor as part of demodulating the RAKE combined signal.

57. The wireless terminal of claim 44, wherein the processing circuit comprises one or more Integrated Circuit (IC) devices.

58. The wireless terminal of claim 44, and wherein at least the scaling processor is implemented as an Integrated Circuit (IC) device.

59. The wireless terminal of claim 44, wherein the receiver comprises a Code Division Multiple Access (CDMA) receiver.

60. The wireless terminal of claim 59, wherein the CDMA receiver comprises a Wideband CDMA (WCDMA) receiver, and wherein the processing circuit is configured to determine the scaling factor for a received High Speed-Downlink Shared Channel (HS-DSCH) signal as the received data signal.

* * * * *

UNITED STATES PATENT AND TRADEMARK OFFICE
CERTIFICATE OF CORRECTION

PATENT NO. : 7,269,205 B2  
APPLICATION NO. : 10/672492  
DATED : September 11, 2007  
INVENTOR(S) : Wang Page 1 of 1

It is certified that error appears in the above-identified patent and that said Letters Patent is hereby corrected as shown below:

On the Title Page, in Field (56), under "U.S. PATENT DOCUMENTS", in Column 1, Line 3, delete "2002/0141515"and insert -- 2002/0141505 --, therefor.

On the Title Page, in Field (56), under "OTHER PUBLICATIONS", in Column 2, Line 5, after "High" delete "S peed" and insert -- Speed --, therefor.

In Column 7, Line 31, in Equation (9), delete "$\underset{s_j \neq s_i(j)}{\max}$" and insert -- $\underset{s_i \in s_i(j)}{\max}$ --, therefor.

In Column 16, Line 54, in Claim 58, delete "and" before "wherein".

Signed and Sealed this

Thirty-first Day of March, 2009

JOHN DOLL  
*Acting Director of the United States Patent and Trademark Office*